Sept. 6, 1938.  J. H. MORRIS  2,129,435
POWER ACTUATED MECHANISM FOR ADJUSTING THE SICKLE OF A MOWING MACHINE
Filed Dec. 14, 1936  2 Sheets-Sheet 1
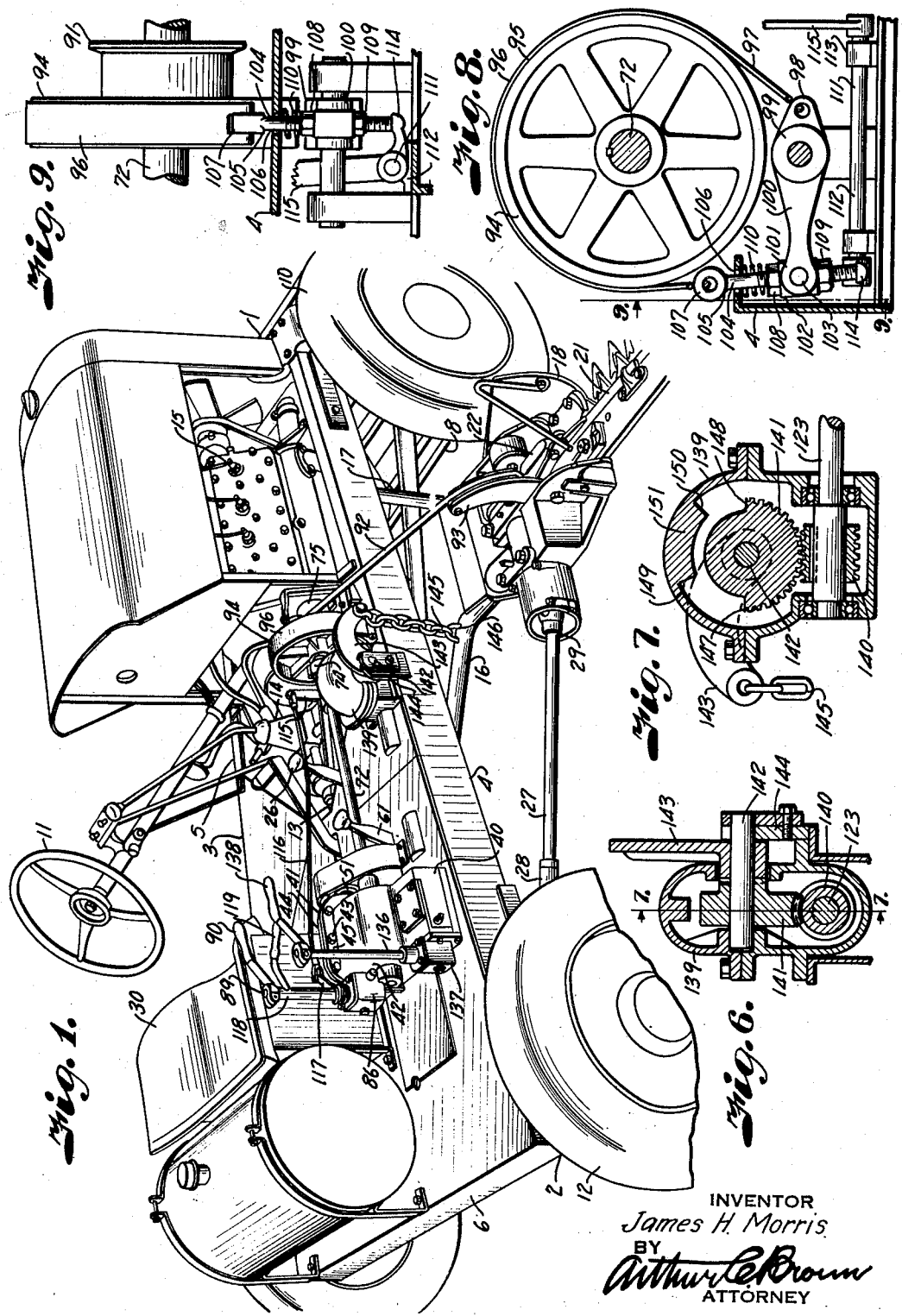
INVENTOR
James H. Morris
BY
Arthur L. Brown
ATTORNEY Sept. 6, 1938.  J. H. MORRIS  2,129,435
POWER ACTUATED MECHANISM FOR ADJUSTING THE SICKLE OF A MOWING MACHINE
Filed Dec. 14, 1936  2 Sheets-Sheet 2
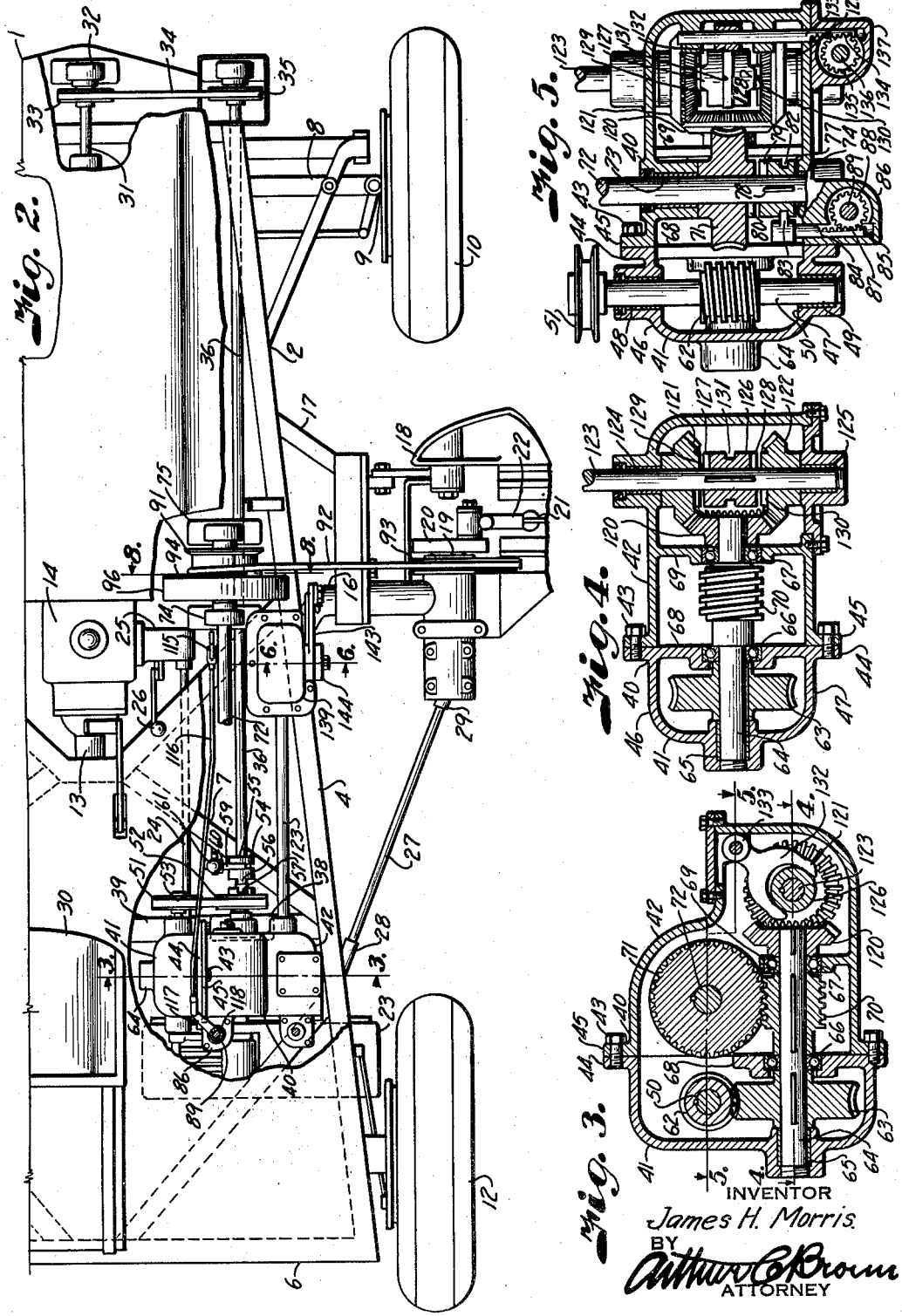
INVENTOR
James H. Morris.
BY Arthur C. Brown
ATTORNEY Patented Sept. 6, 1938

2,129,435

UNITED STATES PATENT OFFICE 2,129,435

POWER ACTUATED MECHANISM FOR ADJUSTING THE SICKLE OF A MOWING MACHINE

James H. Morris, Topeka, Kans., assignor of one-fourth to Charles L. Meinholdt, one-half to Fred P. Martin, and one-fourth to Charles H. Martin, all of Topeka, Kans.

Application December 14, 1936, Serial No. 115,704

11 Claims. (Cl. 56—25)

This invention relates to mowing machines of the character illustrated in application for patent filed by Charles L. Meinholdt, Serial No. 85,724, under date of June 17, 1936, the present invention relating to an improved mechanism for effecting adjustment of the cutting height and inclination of the sickle bar.

The principal object of the invention is to provide a power driven control mechanism whereby the cutting height and inclination of the sickle is readily adjusted through control levers located in convenient reach of the operator's position.

Other important objects of the present invention are to provide for quicker movement of the sickle to selected positions; to provide automatic throw-out of the power when the sickle has been moved to its maximum positions; to provide for automatic retention of the sickle bar in any of its angular positions; to provide for automatic release of the retention means when the angularity of the sickle is to be changed in an upward direction; and to provide power driven control mechanisms operable from the power unit of the machine independently of the sickle driving mechanism.

In accomplishing these and other objects of the invention, as hereinafter pointed out, I have provided improved details of structure, the preferred form of which is illustrated in the accompanying drawings, wherein:

Fig. 1 is a perspective view of a power driven mowing machine equipped with sickle adjusting mechanism embodying the features of the present invention.

Fig. 2 is a plan view of the sickle side of the mowing machine, parts of which are broken away to better illustrate the sickle adjusting mechanisms.

Fig. 3 is a section through the gear housing of the control mechanism on the line 3—3 of Fig. 2.

Fig. 4 is a horizontal section through the gear housing on the line 4—4 of Fig. 3.

Fig. 5 is a similar section on the line 5—5 of Fig 3.

Fig. 6 is a sectional view through the worm gears and their housing for actuating the arm used in raising and lowering the cutting height of the sickle, the section being taken on the line 6—6 of Fig. 2.

Fig. 7 is a section on the line 7—7 of Fig. 6.

Fig. 8 is a detail section on the line 8—8 of Fig 2, particularly illustrating the brake mechanism for controlling rotation of the lifting drum used in winding the cable for changing angular positions of the sickle.

Fig. 9 is a section on the line 9—9 of Fig. 8.

Referring more in detail to the drawings:

1 designates a mowing machine including a mobile chassis 2, the frame 3 of which comprises forwardly converging side sills 4 and 5 connected by cross sills 6 and an intermediate X-shaped brace 7. The front end of the frame is carried upon an axle 8 having steering knuckles 9 mounting wheels 10 that are adapted to be steered by a conventional steering mechanism including the steering wheel 11. The rear of the frame is supported by a conventional axle unit carrying driving wheels 12, the wheels being driven through a driving shaft 13 connected with a transmission gearing indicated by the housing 14 and which forms a part of the motor unit 15 that is mounted in the forward end of the frame.

Pivotally suspended below the frame by means of arms 16 and 17 is a sickle shoe 18 which is mounted for swinging movement about the axis of an eccentric shaft 19 that is provided with an eccentric 20 which operates the sickle bar 21 through a pitman 22. The shaft 19 is driven through a belt type transmission indicated by the housing 23 having a power shaft 24 connected with a power take-off connection 25 of the transmission gearing 14. The power take-off 25 is rendered selectively effective by means of a suitable shifting lever 26. The output shaft of the transmission 23 is connected with the shaft 19 through a shaft 27 having flexible connections 28 and 29 to permit raising and lowering of the heel of the sickle relatively to the chassis frame 3. Located on the frame 3 in alignment with the steering wheel 11 is an operator's seat 30.

The apparatus above described substantially corresponds to the disclosure in the above mentioned application, and specifically forms no part of the present invention, the present invention relating to mechanisms for raising and lowering the arms 16 and 17 and for swinging the sickle about the axis of the eccentric shaft under power of the motor unit, as now to be described.

Fixed to the forward end of the motor crank shaft is a shaft extension 31 having its outer end rotatably mounted in a bearing bracket 32 carried upon a portion of the chassis frame as shown in Fig. 2. Keyed on the shaft 31 is a grooved pulley 33 and operating in the groove thereof is a belt 34 running over a grooved pulley 35 that is fixed on a counter-shaft 36 extending longitudinally of the chassis frame alongside of the motor unit. The shaft 36 is mounted at its forward end in a bearing 37 and has its rear end rotatably mounted in a bearing 38 that is carried upon a supporting member 39 extending transversely of the frame. Carried forwardly of the transmission housing 23 is a gear housing 40 including sections 41 and 42 connected by bolts 43 extending through mating flanges 44 and 45 on the respective sections. The section 42 has opposed side walls 46 and 47 carrying bearings 48 and 49 in which is rotatably mounted a worm shaft 50. The forward end of the worm shaft 50 projects through the bearing 48 and mounts a grooved pulley 51 aligning with a grooved pulley 52 normally rotatably mounted on the driving shaft 36. Operating over the pulleys is an endless belt 53 adapted to effect rotation of the worm shaft when the pulley 52 is operably connected in driving relation with the shaft 36 through a clutch member 54.

The clutch member 54 includes a collar 55 slidably splined upon the drive shaft and which is provided with lugs 56 engageable with lugs 57 formed in the hub 58 of the pulley 52. The clutch collar is provided with a peripheral groove 59 engaging a yoke 60 of an actuating lever 61 wherewith the clutch collar is moved into and out of driving engagement with the hub of the pulley 52.

Mounted on the shaft 50 is a worm 62 meshing with a worm gear 63 that is keyed to a transmission shaft 64 extending transversely of the worm shaft and which has its ends respectively mounted in a bearing 65 formed in the end of the housing section 42 and in antifriction bearings 66 and 67 carried in spaced partitions 68 and 69 of the gear housing, as best shown in Fig. 5. Mounted on the shaft 64 between the partitions is a worm 70 meshing with a worm gear 71 on a countershaft 72 extending in parallel relation with the worm shaft, and which has its ends rotatably mounted in bearings 73 and 74 formed in the side walls of the housing section 41, as best shown in Fig. 5. The shaft 72 projects forwardly of the chassis frame and has its forward end rotatably mounted in spaced bearing brackets 75 and 76 located on the frame in substantial alignment with the sickle as best shown in Fig. 2. The worm gear 71 is loosely mounted on the shaft 72 but is adapted to be selectively connected therewith through a clutch collar 77 slidably fixed on the shaft by a spline 78 and which has lugs 79 engageable with corresponding lugs 80 on the hub of the worm gear. The engaging sides of the respective lugs are bevelled so as to effect automatic disengagement of the clutch collar for a purpose later described.

The clutch collar has an annular groove 82 engaged by a yoke 83 that is carried on a sliding shaft 84 reciprocable in a bearing opening 85 of a lateral extension 86 formed on the rear side of the transmission housing. The shaft 84 has rack teeth 87 meshing with a pinion gear 88 that is fixed to a vertical shaft 89 projecting upwardly alongside of the driver's seat and which is provided with a laterally extending lever 90. It is thus obvious that when the lever is actuated to rock the shaft 89 the gear 88 is rotated to effect reciprocation of the shaft 84 and movement of the clutch collar into and out of driving engagement with the worm gear depending upon the direction of movement of the lever 90.

Fixed to the shaft 72 intermediate the bearing brackets 75 and 76 is a winding drum 91 on which is wound the cable 92 that is connected with an arcuate segment 93 forming a part of the sickle shoe 18 and which projects upwardly therefrom in the direction of the chassis frame. When the shaft 72 is rotated in one direction the cable is wound upon the drum to change the angle of the sickle from its maximum lower position to a maximum upper position. When the sickle is in maximum lower position it depends substantially perpendicular and when the sickle shoe is on normal ground level with the sickle raised to its maximum upper position, it is again substantially perpendicular so that the entire angular movement of the sickle is substantially 180°. When the clutch collar 77 has been disengaged from driving connection with the worm, the shaft is free to turn under the weight of the sickle to cause unwinding of the cable and lowering of the sickle from its maximum upper position to a lower position, and in order to selectively position the sickle at any angle of inclination between its maximum and minimum positions, the winding drum is provided with a brake drum 94 that is keyed to the shaft and has its peripheral face 95 carrying a brake band 96, one end 97 of which is connected to a short arm 98 of a toggle lever 99, the longer arm 100 of which terminates in a yoke 101 that is pivotally connected with a block 102 by lateral pins 103.

Adjustably mounted in a bore of the block 102 is a threaded shank 104 of an eye bolt 105. The shank of the eye bolt is slidably mounted in an opening 106 formed in the upper flange of the sill 4 to support the eye 107 in position to be connected to the other end of the brake band 96, as clearly shown in Fig. 9. Threaded on the shank of the eye bolt and engaging the respective sides of the block 102 are nuts 108 and 109 to adjustably fix the block in selected position on the eye bolt. Sleeved on the eye bolt and having one end engaging under the flange of the sill 4 and its opposite end against the nut 108 is a coil spring 110, for tightening the band about the periphery of the brake drum and preventing rotation of the winding drum in sickle lowering direction. This is accomplished for the reason that the short lever arm 98 moves through a shorter arc than the longer arm 100, however, when the longer lever arm is moved in opposition to the spring 110 the band is loosened upon the brake drum so that it is free to rotate thereby permitting angular adjustment of the sickle bar to a lower position.

This movement of the lever arm is accomplished by means of a rock shaft 111 mounted in spaced bearings 112 and 113 that are carried by a part of the chassis frame. Fixed on the end of the shaft 111 adjacent the eye bolt is a lever arm 114 engaging under the free end of the bolt shank as shown in Fig. 9. Fixed to the opposite end of the shaft 111 is an actuating lever 115 that is connected by a rod 116 with an arm 117 fixed to the lower end of a tubular sleeve 118 that is rotatably mounted on the shaft 89 previously mentioned. Fixed to the upper end of the sleeve 118 is a laterally extending hand lever 119 wherewith the sleeve is rocked to effect movement of the lever 115 through the rod 116 and rocking of the shaft 111 to relieve braking action on the winding drum. When the hand lever 119 is released the spring 110 is again effective to tighten the band and return the hand lever 119 to its original position. When the winding drum is rotated to raise the outer end of the sickle the direction of movement of the brake drum is toward the shorter lever arm 98 so that the pulling force applied by the wheel to the brake band effects rocking movement of the lever 99 against action of the spring 110 so that the brake is automatically released, however, as soon as the lever 90 is actuated to stop rotation of the drum the spring again becomes effective to stop further rotation of the winding drum.

When the sickle has been raised to its maximum position the arm 93 comes into stopped engagement with a part of the shoe to prevent further rotation of the winding drum whereupon the angle shape of the clutch lugs becomes effective to push the clutch 77 out of driving engagement with the clutch lugs on the worm gear 71 so as to prevent damage to the parts in case the operator should not release the lever 90 when the sickle has been moved to its upper maximum position.

In order to raise and lower the shoe 18, I provide an elevating connection operable by the motor unit through the transmission operating the winding drum. This is accomplished by equipping the worm shaft 64 with a bevel pinion 120 meshing with bevelled pinions 121 and 122 that are rotatably mounted on a shaft 123 extending through the transmission housing and rotatably supported in bearings 124 and 125. Slidably splined on the shaft intermediate the pinions 121 and 122 is a clutch collar 126 having clutch engaging lugs 127 and 128 on its respective ends to engage complementary clutch faces 129 and 130 on the facing sides of the pinions 121 and 122. The clutch collar 126 is provided with an annular groove 131 that is engaged by a yoke 132 carried on a shifting rod 133 that is slidably mounted in the housing as best shown in Fig. 5. One end of the rod is provided with teeth 134 that mesh with the teeth of a pinion gear 135 similar to the pinion gear 88, previously described.

The gear 135 is fixed on a vertical shaft 136 having its lower end rotatably supported in the housing extension 137 which encloses the pinion. The opposite end of the shaft extends upwardly in parallel relation with the shaft 89 to mount a hand lever 138 whereby the clutch collar may be selectively shifted into or out of engagement with either of the pinion gears 121 and 122. The clutch lugs have bevelled sides whereby the clutch collar is automatically moved to disengaged position when the limit of rotation of the shaft 123 is reached as later described. The forward end of the shaft 123 is rotatably mounted in a housing 139 that is carried on the frame 2 at a point above the arm 16. Fixed on the shaft is a worm 140 meshing with a worm gear segment 141 that is carried within the housing on a transverse shaft 142 and which has one end projecting through the housing to mount an arcuate lever 148. The end of the shaft projects beyond the lever and is carried in a bearing bracket 149 formed as a part of the housing 139 as best shown in Fig. 6.

Connected with the free end of the arcuate lever is a flexible connection 145, having its depending end supportingly connected with the arm 16 as indicated at 146. The worm gear segment 141 has stop shoulders 147 and 148 that are adapted to engage against the ends 149 and 150 of a stop lug 151 projecting inwardly of the casing in line with the path of the stop shoulder of the gear. The worm gear, when idle, supports the heel of the sickle in a predetermined elevated position.

In operating the mowing machine with the power control as above described, the motor is started and the lever 61 is actuated to engage the clutch 54 with the pulley to drive the worm shaft of the transmission. The heel of the sickle is then selectively positioned by the operator by shifting of the hand lever 138 in the proper direction. For example, when the lever is shifted to cause driving engagement of one of the pinions with the shaft 123, the worm 140 is rotated to move the worm segment in one direction and when the lever is shifted in the opposite direction the other pinion becomes effective in rotating the shaft in the opposite direction. After adjusting the heel of the sickle the outer end thereof may be lowered to cutting position through operation of the lever 119. Movement of the hand lever 119 rocks the arm 115, shaft 111, and arm 114 to move the toggle lever 99 against action of the spring 110, thereby relieving braking pressure of the band 96 and freeing the winding drum so that the sickle falls toward a selected cutting position responsive to gravity. When the desired cutting angle is reached the lever 119 is released so that the spring 110 again becomes effective in stopping rotation of the winding drum, thereby supporting the sickle in a selected angular position. When it is desired to raise the forward end of the sickle bar the lever 90 is operated to engage the clutch collar 77 with the worm gear 71, thereby causing rotation of the shaft 72 in a clockwise direction, Fig. 8, to wind the cable on the drum. As soon as the hand lever 90 is actuated to disengage the clutch the brake band becomes effective to hold the sickle in selected position.

From the foregoing it is obvious that I have provided a control mechanism for adjusting the positions of a sickle whereby the operating power is furnished from the motor unit without interference of the sickle driving mechanism or the transmission which propels the vehicle. It is also obvious that the controls are so constructed as to prevent damage to the operating mechanisms when the sickle has been moved to its maximum positions.

What I claim and desire to secure by Letters Patent is:

1. In a power driven mowing machine including a frame, a sickle pivotally supported from the frame and a power unit for actuating the machine, a winding drum on the frame, a supporting cable having one end connected with the sickle and its other end wound on the drum, means for actuating the winding drum from the power unit, means for selectively rendering said actuating means effective, a brake controlling rotation of the drum, and means releasing the brake when said actuating means is rendered effective.

2. In a power driven mowing machine including a frame, a sickle pivotally supported from the frame and a power unit for actuating the machine, a winding drum on the frame, a supporting cable having one end connected with the sickle and its other end wound on the drum, means for actuating the winding drum from the power unit, means for selectively rendering said actuating means effective in rotating the winding drum in one direction, a brake controlling rotation of the winding drum, and means releasing the brake to allow rotation of the winding drum under gravitational influence of the sickle.

3. In a power driven mowing machine including a frame, a sickle pivotally supported from the frame and a power unit for actuating the machine, a winding drum on the frame, a supporting cable having one end connected with the sickle and its other end wound on the drum, means for actuating the winding drum from the power unit, means for selectively rendering said actuating means effective, a brake controlling rotation of the winding drum, means releasing the brake when said actuating means is rendered effective, and manual means for selectively releasing the brake.

4. In a power driven mowing machine including a frame, a sickle mounted on the frame for vertical and pivotal movement, a motor unit for operating the machine including the sickle, means for raising the sickle under power of the motor unit, means for selectively rendering said raising means effective, means for pivotally moving the sickle under power of the motor unit, and means for selectively rendering said last named means effective.

5. In a power driven mowing machine including a frame, a sickle pivotally supported from the frame and a power unit for actuating the machine, a winding drum on the frame, a supporting cable having one end connected with the sickle and its other end wound on the drum, means for actuating the winding drum from the power unit, means for selectively rendering said actuating means effective, a brake drum connected with the winding drum, a brake band on the brake drum, a lever having long and short arms pivotally connected with the respective ends of the brake band, a spring engaging the long end of the lever to retain the brake band in gripping relation with the brake drum, and means for rocking the lever against action of the spring to release the brake band.

6. In a power driven mowing machine including a frame, a sickle mounted on the frame for vertical movement relatively to the frame, a motor unit for operating the machine including the sickle, a driving connection with the motor unit including a worm and worm gear segment, a crank arm connected with the worm gear segment, and means connecting the crank arm with the sickle to raise and lower the sickle upon actuation of the driving connection.

7. In a power driven mowing machine including a frame, a sickle mounted on the frame for vertical and pivotal movement, a motor unit for operating the machine including the sickle, means for raising the sickle under power of the motor unit, means for selectively rendering said raising means effective, means for pivotally moving the sickle actuated by the motor unit, means for selectively rendering said last named means effective, and brake means for controlling lowering movement of the sickle.

8. In a power driven mowing machine including a frame, a sickle supporting means, means movably mounting the sickle supporting means on said frame, a sickle, means pivotally mounting the sickle on said supporting means, a motor unit on the frame for operating the machine including said sickle, means on the frame and having connection with said motor unit and the sickle supporting means for moving said sickle to change the cutting height thereof, and a second actuating means having connection with the motor unit and with the sickle for changing the cutting angle of the sickle on said supporting means.

9. In a power driven mowing machine including a frame, a sickle, a sickle supporting means, means pivotally connecting the sickle supporting means with the frame, means pivotally connecting the sickle with said supporting means, a motor unit for actuating the machine, raising and lowering means on the frame having connection with said sickle supporting means for raising and lowering said supporting means on its pivotal mounting to change the cutting height of the sickle, an actuating connection between the motor unit and said sickle raising and lowering means, and independent means for pivotally moving the sickle on said supporting means to change the cutting angle thereof independently of said sickle raising and lowering means.

10. In a power driven mowing machine including a frame, a sickle, sickle supporting means, means pivotally connecting the sickle supporting means with the frame, means pivotally mounting the sickle on said supporting means, a motor unit for actuating the machine, raising and lowering means on the frame having connection with said sickle supporting means for raising and lowering said supporting means on its pivotal mounting to change the cutting height of the sickle, an actuating connection between the motor unit and said sickle raising and lowering means, a winding drum on the frame, a supporting cable having one end connected with the sickle and its other end wound on the drum, a driving connection between the winding drum and the motor unit, and means for selectively rendering said last named driving connection effective for changing the cutting angle of the sickle independently of said sickle raising and lowering means.

11. In a power driven mowing machine including a frame, a sickle supporting means, means movably mounting the sickle supporting means on said frame, a sickle, means pivotally mounting the sickle on said supporting means, a motor unit on the frame for operating the machine including said sickle, a shaft rotatably mounted on the frame, forward and reverse means connecting the shaft with the motor unit, a lever arm on the frame, means connecting the lever arm with the sickle supporting means, a gearing connecting the shaft with the lever arm, means for selectively rendering said forward and reverse means effective to raise and lower the sickle supporting means, and means having connection with the motor unit and with the sickle for changing the cutting angle of the sickle on said supporting means.

JAMES H. MORRIS.